(12) United States Patent
Han et al.

(10) Patent No.: US 6,504,677 B1
(45) Date of Patent: Jan. 7, 2003

(54) MULTI-LAYER STITCHED WRITE HEAD DESIGN FOR HIGH DATA RATE APPLICATION

(75) Inventors: Cherng-Chyi Han, San Jose, CA (US); Mao-Min Chen, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 09/472,996

(22) Filed: Dec. 28, 1999

(51) Int. Cl.[7] .................................................. G11B 5/31
(52) U.S. Cl. ...................................................... 360/126
(58) Field of Search ................................. 360/126, 120, 360/122, 123, 125

(56) References Cited

U.S. PATENT DOCUMENTS

| | | | |
|---|---|---|---|
| 5,245,493 A | * 9/1993 | Kawabe et al. | 360/126 |
| 5,802,700 A | 9/1998 | Chen et al. | 29/603.14 |
| 5,805,391 A | 9/1998 | Chang et al. | 360/113 |
| 5,828,533 A | * 10/1998 | Ohashi et al. | 360/126 |
| 5,878,481 A | 3/1999 | Feng et al. | 29/603.15 |
| 6,104,576 A | * 8/2000 | Santini | 360/126 |
| 6,111,724 A | * 8/2000 | Santini | 360/126 |
| 6,163,436 A | * 12/2000 | Sasaki et al. | 360/126 |
| 6,191,916 B1 | * 2/2001 | Sasaki | 360/126 |
| 6,204,997 B1 | * 3/2001 | Sasaki | 360/123 |

* cited by examiner

*Primary Examiner*—David Hudspeth
*Assistant Examiner*—Angel Castro
(74) *Attorney, Agent, or Firm*—George O. Saile; Stephen B. Ackerman; Larry J. Prescott

(57) ABSTRACT

A design for a magnetic write head having multi-layer stitched poles, a small throat height, and a recessed yoke design is described. The write head is formed of a number of planar layers and in one embodiment the write head also has a planar top surface. In another embodiment the planarity of the top layer is disturbed in order to provide an additional wiring layer. The magnetic write head is formed on a layer of ferromagnetic material which can also be used as a shield layer for a read head combined with the write head. A first pole piece has a notch which defines the throat height of the write head. A second pole piece, recessed from the air bearing surface plane, is magnetically stitched to the first pole piece. A third pole piece, further recessed from the air bearing surface plane, is magnetically stitched to the second pole piece.

20 Claims, 3 Drawing Sheets

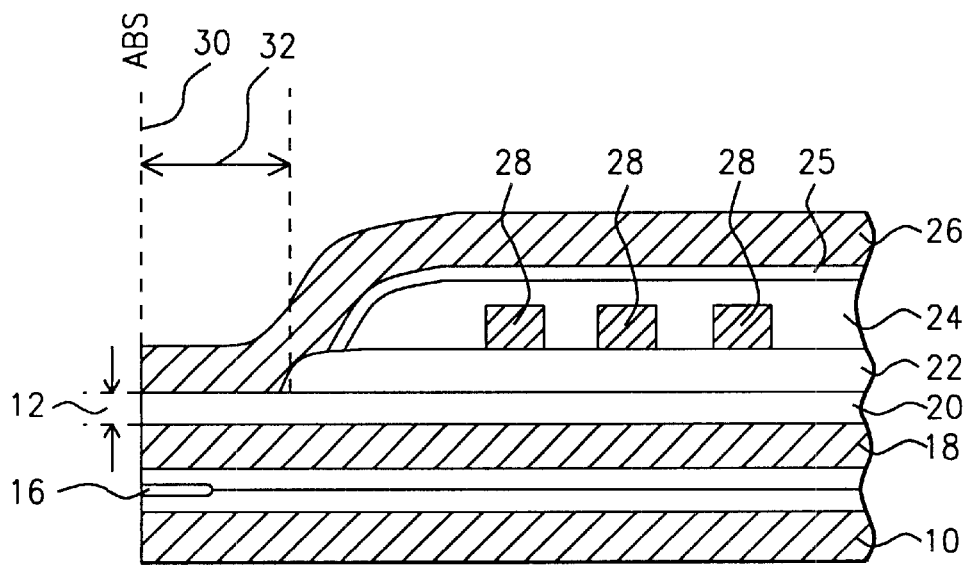
*FIG. 1 - Prior Art*
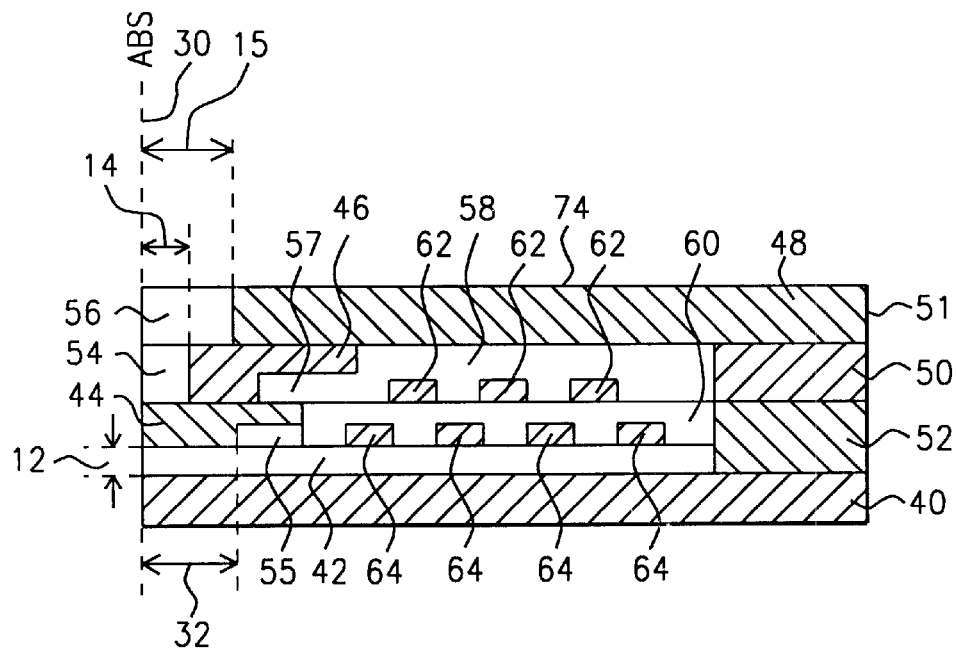
*FIG. 2*

MULTI-LAYER STITCHED WRITE HEAD DESIGN FOR HIGH DATA RATE APPLICATION

BACKGROUND OF THE INVENTION (1) Field of the Invention

This invention relates to a high data rate magnetic write head and more particularly to a multi-layer stitched magnetic write head design.

(2) Description of the Related Art

Magnetic read heads, often referred to as inductive read heads, must be designed in such a way that the magnetic flux extends across the air bearing surface into the magnetic media as much as possible. A cross section view of a conventional magnetic read/write head is shown in FIG. 1. As shown in FIG. 1 a magnetic sensor 16 is placed adjacent to the air bearing surface 30 of the head between a first ferromagnetic shield 10 and a second ferromagnetic shield 18 ferromagnetic shield.

The second ferromagnetic shield 18 also serves as the first pole piece 18 for the write portion of the head. A first non-magnetic gap layer 20 is formed on the first pole piece 18 and determines the gap 12 between the first pole piece 18 and the second pole piece 26 at the plane of the air bearing surface (ABS) 30. A second non-magnetic gap layer 22 is formed on the first non-magnetic gap layer 20 beginning a first distance 32 away from the ABS plane 30. The beginning of the second non-magnetic gap layer 22 defines the point where the gap 12 between the first pole piece 18 and the second pole piece 26 begins to widen. A layer of wiring 28, imbedded in a layer of insulating material 24, is formed on the second non-magnetic gap layer 20. An additional insulation layer 25 may be used to provide a smoother surface on which to form the second pole piece 26. The second pole piece is formed over the first non-magnetic gap layer, the second non-magnetic gap layer, and the additional insulation layer 25. It is advantageous to have the first distance 32 as small as possible in order to have the optimum distribution of magnetic flux.

U.S. Pat. No. 5,805,391 to Chang et al. describes a write head with a recessed stitched yoke on a planar portion of an insulation layer defining the zero throat height, or the point where the gap between pole pieces begins to widen. A second pole piece if formed of two pole piece components stitched together, or placed in contact to reduce the non-magnetic gap between the two pole components to zero.

U.S. Pat. No. 5,802,700 to Chen et al. describes a method of making a planarized thin film magnetic write head with submicron trackwidth.

U.S. Pat. No. 5,878,481 to Feng et al. describes a pole trimming method of forming a magnetic transducer structure.

SUMMARY OF THE INVENTION

In the design of magnetic write heads for high track per inch or low trackwidth applications it is important to have the throat height as small as possible. The throat height is the distance from the ABS end of the poles to point where the non-magnetic gap between the poles begins to widen, reference number 32 in FIG. 1. A stitched pole design can be used to improve the throat height but it is also necessary to have a recessed yoke design. The recessed yoke design provides a separation between the second pole piece, reference number 26 in FIG. 1, and the air bearing surface at the point where the second pole piece curves to provide an increased non-magnetic gap width.

It is a principle objective of this invention to provide a magnetic write head having multi-layer stitched poles, a small throat height, a recessed yoke design, and a planar top surface.

It is another principle objective of this invention to provide a magnetic write head having multi-layer stitched poles, a small throat height, and a recessed yoke design.

These objectives are achieved by using a multi-layer stitched pole design. A non-magnetic gap layer is formed on a layer of ferromagnetic material. A first pole piece is then formed on the non-magnetic gap layer. A notch is formed in the first pole piece to define the throat height. A second pole piece, recessed from the first pole piece is then formed making contact with the first pole piece. A third pole piece, recessed from the second pole piece is formed making contact with the second pole piece. The first, second, and third pole pieces form a stitched pole since there are regions of zero non-magnetic gap between the first pole piece and the second pole piece and between the second pole piece and the third pole piece. The notch in the first pole piece defines the throat height, the recessed second and third pole pieces form a recessed yoke, and the structure can be made planar.

BRIEF DESCRIPTION OF THE DRAWINGS

FIG. 1 shows a cross section view of a conventional magnetic write head.

FIG. 2 shows a cross section view of a magnetic write head of this invention having a planarized top surface.

DESCRIPTION OF THE PREFERRED EMBODIMENTS

Refer now to FIGS. 2, 4, 5, and 6 for a description of the preferred embodiment of the write head design of this invention. FIG. 2 shows a cross section view of a preferred embodiment of the magnetic write head of this invention. A layer of first ferromagnetic material 40 forms one of the pole pieces of the magnetic write head. Those skilled in the art will readily recognize that the magnetic write head can be combined with a read head, however only the write head will be described here. This layer of first ferromagnetic material 40 will also act as a magnetic shield for the case where a read head is combined with the write head.

Figure 4:
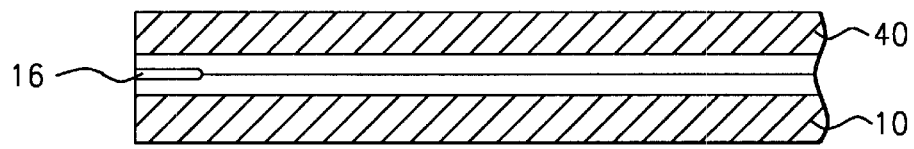
FIG. 4 shows a cross section view of a magnetic read head which can be combined with the magnetic write heads of this invention.

FIG. 4 shows a magnetic read head which can be combined with the magnetic write head of this invention. The read head has a magnetic sensing element 16 between a first shield 40 and a second shield 10 which act as magnetic shields for the read head. The first and second shields are ferromagnetic material such as NiFe or permalloy. The first shield 40 is the layer of first ferromagnetic material 40 forming one of the pole pieces of the magnetic write head shown in FIG. 2. The ferromagnetic material can be any soft ferromagnetic material such as NiFe or permalloy.

Figure 5:
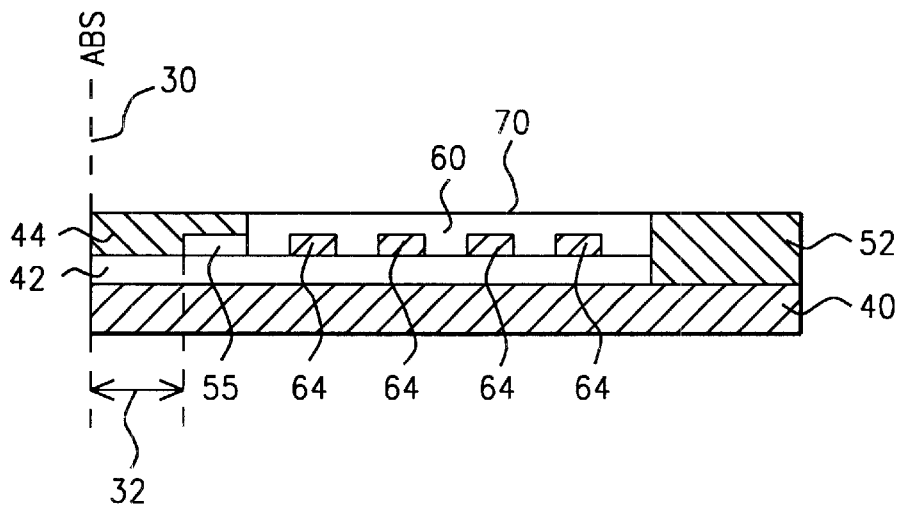
FIG. 5 shows a cross section view of a part of the magnetic write head of this invention after the first pole piece has been formed and the head planarized.

As shown in FIGS. 2 and 5 a gap layer of first nonmagnetic dielectric material 42, such as alumina, having a first end and a second end is formed on the layer of ferromagnetic material. The first end of the gap layer 42 lies on the air bearing surface (ABS) plane 30. The gap layer 42 determines the non-magnetic gap width 12 at the air bearing surface end of the write head. The gap width 12 is between about 0.5 and 0.05 microns. The air bearing surface (ABS) plane 30 is shown as a dashed line in FIG. 2. A first pole piece 44 having a first end and a first notch 55 is formed on the gap layer 42 such that the first end of the first pole piece 44 is on the ABS plane 30. The first notch 55 is a first distance 32 from the ABS plane 30. The first distance 32 is also the throat height 32 of the write head and in this example is between about 0.5 and 3.0 microns.

A first back gap piece 52, of ferromagnetic material, is formed on the layer of first ferromagnetic material 40 adjacent to the second end of the gap layer of non-magnetic dielectric material 42 at the back gap end 51 of the write head. The first back gap piece 52 makes contact with the layer of first ferromagnetic material 40 so that they are magnetically stitched together. The region 60 between the first pole piece 44 and the first back gap piece 52 has a first wiring layer 64 and is filled with a second non-magnetic dielectric material, in this example alumina. The second non-magnetic dielectric material also fills the first notch 55. The formation of the write head at this stage is shown in FIG. 5. FIG. 5 shows that the top surface 70 of the write head at this stage of fabrication is planar making subsequent fabrication steps easier.

Figure 6:
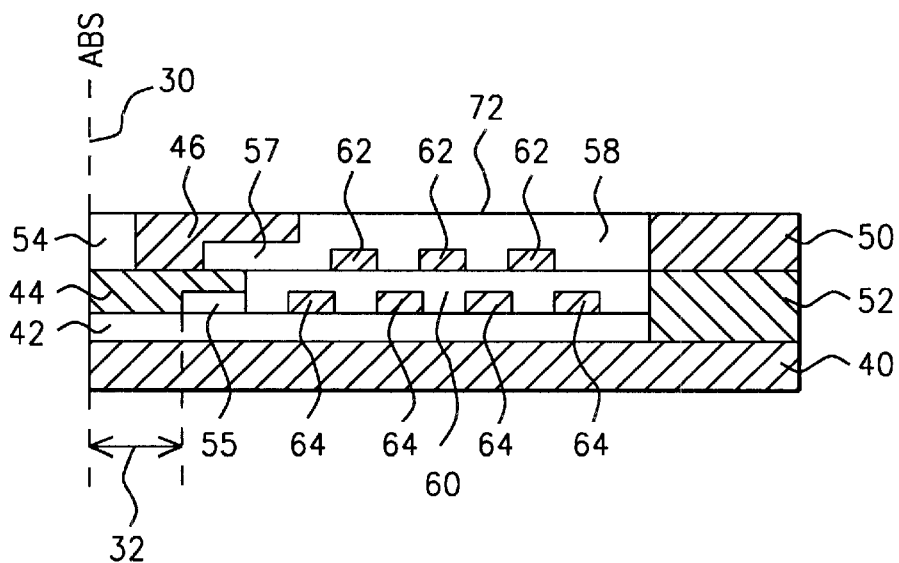
FIG. 6 shows a cross section view of a part of the magnetic write head of this invention after the second pole piece has been formed and the head planarized.

As shown in FIGS. 2 and 6, a second pole piece 46 having a first end and a second notch 57 is formed on the planar layer having the first pole piece 44, the first back gap piece 52, and the layer of second non-magnetic dielectric with the imbedded first wiring layer 64. The second pole piece 46 is typically formed of the same ferromagnetic material as the first pole piece 44, in this example NiFe or permalloy. The first end of the second pole piece 46 is recessed a second distance 14 from the ABS plane 30. In this example the second distance 14 is between about 0.5 and 2.0 microns. A portion of the second pole piece 46 contacts the first pole piece 44 so that the first pole piece 44 and the second pole piece 46 are magnetically stitched together. The second notch 57 further widens the non-magnetic gap between the stitched pole pieces and the layer of first ferromagnetic material 40.

A second back gap piece 50, of ferromagnetic material, is formed on the first back gap piece 52 and is in contact with the first back gap piece 52 so that the first back gap piece 52 and the second back gap piece 50 are magnetically stitched together. The region 58 between the second pole piece 46 and the second back gap piece 50 is filled with the second non-magnetic dielectric, such as alumina, and has a second wiring layer 62 formed therein. The second notch 57 is also filled with the second non-magnetic dielectric. The region 54 between the second pole piece 46 and the ABS plane 30 is also filled with the second non-magnetic dielectric. The formation of the write head at this stage is shown in FIG. 6. FIG. 6 shows that the top surface 72 of the write head at this stage of fabrication is planar making subsequent fabrication steps easier.

As shown in FIG. 2, a third pole piece 48 having a first end and a second end is formed on the planar layer having the second pole piece 46, the second back gap piece 50, and the layer of second non-magnetic dielectric with the second imbedded wiring layer 62. The third pole piece 48 is typically formed of the same ferromagnetic material as the first pole piece 44 and the second pole piece 46, in this example NiFe or permalloy. The first end of the third pole piece 48 is recessed a third distance 15 from the ABS plane 30. In this example the third distance 15 is between about 2.0 and 4.0 microns. A portion of the third pole piece 48 contacts the second pole piece 46 so that the second pole piece 46 and the third pole piece 48 are magnetically stitched together. Another portion of the third pole piece 48 contacts the second back gap piece 50 so that the third pole piece 48 and the second back gap piece 50 are magnetically stitched together. The region 56 between the first end of the third pole piece 48 and the ABS plane 30 is filled with the second non-magnetic dielectric so that the top surface 74 of the completed write head is planar. A cross section of the completed write head is shown in FIG. 2.

Figure 3:
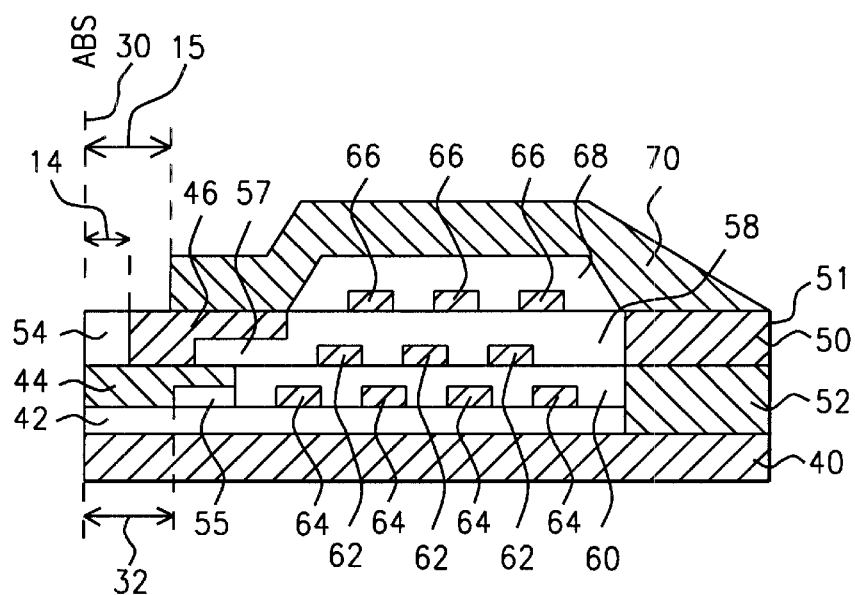
FIG. 3 shows a cross section view of a magnetic write head of this invention without a planarized top surface.

Refer now to FIGS. 3, 4, 5, and 6 for another preferred embodiment of the write head design of this invention. FIG. 3 shows a cross section view of this embodiment of the magnetic write head of this invention. A layer of first ferromagnetic material 40 forms one of the pole pieces of the magnetic write head. Those skilled in the art will readily recognize that the magnetic write head can be combined with a read head, however only the write head will be described here. This layer of first ferromagnetic material 40 will also act as a magnetic shield for the case where a read head is combined with the write head.

FIG. 4 shows a magnetic read head which can be combined with the magnetic write head of this invention. The read head has a magnetic sensing element 16 between a first shield 40 and a second shield 10 which act as magnetic shields for the read head. The first and second shields are ferromagnetic material such as NiFe or permalloy. The first shield 40 is the layer of first ferromagnetic material 40 forming one of the pole pieces of the magnetic write head shown in FIG. 3. The ferromagnetic material can be any soft ferromagnetic material such as NiFe or permalloy.

As shown in FIGS. 3 and 5 a gap layer of first nonmagnetic dielectric material 42, such as alumina, having a first end and a second end is formed on the layer of ferromagnetic material. The first end of the gap layer 42 lies on the air bearing surface (ABS) plane 30. The gap layer 42 determines the non-magnetic gap width 12 at the air bearing surface end of the write head. The gap width 12 is between about 0.05 and 0.5 microns. The air bearing surface (ABS) plane 30 is shown as a dashed line in FIG. 3. A first pole piece 44 having a first end and a first notch 55 is formed on the gap layer 42 such that the first end of the first pole piece 44 is on the ABS plane 30. The first notch 55 is a first distance 32 from the ABS plane 30. The first distance 32 is also the throat height 32 of the write head and in this example is between about 0.5 and 3.0 microns.

A first back gap piece 52, of ferromagnetic material, is formed on the layer of first ferromagnetic material 40 adjacent to the second end of the gap layer of non-magnetic dielectric material 42 at the back gap end 51 of the write head. The first back gap piece 52 makes contact with the layer of first ferromagnetic material 40 so that they are magnetically stitched together. The region 60 between the first pole piece 44 and the first back gap piece 52 has a first wiring layer 64 and is filled with a second non-magnetic dielectric material, in this example alumina. The second non-magnetic dielectric material also fills the first notch 55. The formation of the write head at this stage is shown in FIG. 5. FIG. 5 shows that the top surface 70 of the write head at this stage of fabrication is planar making subsequent fabrication steps easier.

As shown in FIGS. 3 and 6, a second pole piece 46 having a first end and a second notch 57 is formed on the planar layer having the first pole piece 44, the first back gap piece 52, and the layer of second non-magnetic dielectric with the imbedded first wiring layer 64. The second pole piece 46 is typically formed of the same ferromagnetic material as the first pole piece 44, in this example NiFe or permalloy. The first end of the second pole piece 46 is recessed a second distance 14 from the ABS plane 30. In this example the second distance 14 is between about 0.5 and 2.0 microns. A portion of the second pole piece 46 contacts the first pole piece 44 so that the first pole piece 44 and the second pole piece 46 are magnetically stitched together. The second notch 57 further widens the non-magnetic gap between the stitched pole pieces and the layer of first ferromagnetic material 40.

A second back gap piece 50, of ferromagnetic material, is formed on the first back gap piece 52 and is in contact with the first back gap piece 52 so that the first back gap piece 52 and the second back gap piece 50 are magnetically stitched together. The region 58 between the second pole piece 46 and the second back gap piece 50 is filled with the second non-magnetic dielectric, such as alumina, and has a second wiring layer 62 formed therein. The second notch 57 is also filled with the second non-magnetic dielectric. The region 54 between the second pole piece 46 and the ABS plane 30 is also filled with the second non-magnetic dielectric. The formation of the write head at this stage is shown in FIG. 6. FIG. 6 shows that the top surface 72 of the write head at this stage of fabrication is planar making subsequent fabrication steps easier.

This write head at this point of the fabrication is exactly the same as the write head of the previous embodiment. Next, as shown in FIG. 3, a third pole piece 70 having a first end and a second end is formed on the planar layer having the second pole piece 46, the second back gap piece 50, and the layer of second non-magnetic dielectric with the second imbedded wiring layer 62. The third pole piece 70 is typically formed of the same ferromagnetic material as the first pole piece 44 and the second pole piece 46, in this example NiFe or permalloy. The first end of the third pole piece 70 is recessed a third distance 15 from the ABS plane 30. In this example the third distance is between about 2.0 and 4.0 microns. A portion of the third pole piece 70 contacts the second pole piece 46 so that the second pole piece 46 and the third pole piece 70 are magnetically stitched together. Another portion of the third pole piece 70 contacts the second back gap piece 50 so that the third pole piece 70 and the second back gap piece 50 are magnetically stitched together.

The third pole piece 70 in this embodiment has an interior region 68 containing a third wiring layer 66. The interior region 68 is filled with the second non-magnetic dielectric material. A cross section of the completed write head is shown in FIG. 3.

While the invention has been particularly shown and described with reference to the preferred embodiments thereof, it will be understood by those skilled in the art that various changes in form and details may be made without departing from the spirit and scope of the invention.

What is claimed is:

1. A multi-layer stitched write head, comprising:
  a layer of a first ferromagnetic material having a first surface and a first end wherein said first end of said layer of said first ferromagnetic material lies on a first plane and said first plane is perpendicular to said first surface of said layer of first ferromagnetic material;
  a layer of a first non-magnetic dielectric material, formed on said first surface of said layer of said first ferromagnetic material;
  a first pole piece, having a first end and a first notch, wherein said first end of said first pole piece lies on said first plane, that part of said first pole piece within a first distance from said first end of said first pole piece contacts said layer of said first non-magnetic dielectric material, said first notch is filled with a second non-magnetic dielectric material, and said second non-magnetic dielectric material filling said first notch is between said first pole piece and said first surface of said layer of said first ferromagnetic material;
  a second pole piece, having a first end and a second notch, wherein said first end of said second pole piece lies on a second plane, said second plane is parallel to said first plane, said second plane is a second distance from said first plane, that part of said second pole piece between said first end of said second pole piece and said second notch contacts said first pole piece, said second notch and the region between said first end of said second pole piece and said first plane are filled with said second non-magnetic dielectric material, and said second non-magnetic dielectric material filling said second notch is between said second pole piece and said first surface of said layer of said first ferromagnetic material; and
  a layer of a second ferromagnetic material having a first end, a first surface, and a second surface, wherein said first end of said layer of said second ferromagnetic material lies on a third plane, said third plane is parallel to said first plane, said third plane is a third distance from said first plane, said third distance is greater than said second distance, part of said second surface of said layer of said second ferromagnetic material contacts said second pole piece, said first surface of said layer of second ferromagnetic material lies in a fourth plane perpendicular to said third plane, and the region between said first end of said layer of said second ferromagnetic material and said first plane is filled with said second non-magnetic dielectric material.

2. The multi-layer stitched write head of claim 1 wherein said first ferromagnetic material and said second ferromagnetic material are NiFe.

3. The multi-layer stitched write head of claim 1 wherein said first ferromagnetic material and said second ferromagnetic material are permalloy.

4. The multi-layer stitched write head of claim 1 wherein said first pole piece and said second pole piece are formed of NiFe.

5. The multi-layer stitched write head of claim 1 wherein said first pole piece and said second pole piece are formed of permalloy.

6. The multi-layer stitched write head of claim 1 wherein said first non-magnetic dielectric material is alumina.

7. The multi-layer stitched write head of claim 1 wherein said second non-magnetic dielectric material is alumina.

8. The multi-layer stitched write head of claim 1 wherein said first distance is between about 0.5 and 3.0 microns.

9. The multi-layer stitched write head of claim 1 wherein said second distance is between about 0.5 and 2.0 microns.

10. The multi-layer stitched write head of claim 1 wherein said third distance is between about 2.0 and 4.0 microns.

11. A multi-layer stitched write head, comprising:
  a layer of a ferromagnetic material having a first surface and a first end wherein said first end of said layer of said ferromagnetic material lies on a first plane and said first plane is perpendicular to said first surface of said layer of ferromagnetic material;
  a layer of a first non-magnetic dielectric material, formed on said first surface of said layer of said ferromagnetic material;

a first pole piece, having a first end and a first notch, wherein said first end of said first pole piece lies on said first plane, that part of said first pole piece within a first distance from said first end of said first pole piece contacts said layer of said first non-magnetic dielectric material, said first notch is filled with a second non-magnetic dielectric material, and said second non-magnetic dielectric material filling said first notch is between said first pole piece and said first surface of said layer of said ferromagnetic material;

a second pole piece, having a first end and a second notch, wherein said first end of said second pole piece lies on a second plane, said second plane is parallel to said first plane, said second plane is a second distance from said first plane, that part of said second pole piece between said first end of said second pole piece and said second notch contacts said first pole piece, said second notch and the region between said first end of said second pole piece and said first plane are filled with said second non-magnetic dielectric material, and said second non-magnetic dielectric material filling said second notch is between said second pole piece and said first surface of said layer of said ferromagnetic material; and a third pole having a first end and a second end, wherein said first end of said third pole lies on a third plane, said third plane is parallel to said first plane, said third plane is a third distance from said first plane, said third distance is greater than said second distance, and part of said third pole contacts said second pole piece.

12. The multi-layer stitched write head of claim 11 wherein said ferromagnetic material is NiFe.

13. The multi-layer stitched write head of claim 11 wherein said ferromagnetic material is permalloy.

14. The multi-layer stitched write head of claim 11 wherein said first pole piece, said second pole piece, and said third pole piece are formed of NiFe.

15. The multi-layer stitched write head of claim 11 wherein said first pole piece, said second pole piece, and said third pole piece are formed of permalloy.

16. The multi-layer stitched write head of claim 11 wherein said first non-magnetic dielectric material is alumina.

17. The multi-layer stitched write head of claim 11 wherein said second non-magnetic dielectric material is alumina.

18. The multi-layer stitched write head of claim 11 wherein said first distance is between about 0.5 and 3.0 microns.

19. The multi-layer stitched write head of claim 11 wherein said second distance is between about 0.5 and 2.0 microns.

20. The multi-layer stitched write head of claim 11 wherein said third distance is between about 2.0 and 4.0 microns.

* * * * *